United States Patent
Min

(10) Patent No.: US 6,930,729 B2
(45) Date of Patent: Aug. 16, 2005

(54) APPARATUS AND METHOD FOR DELETING SAWTOOTH WAVE

(75) Inventor: In-hong Min, Seoul (KR)

(73) Assignee: Samsung Electronics Co., LTD, Kyungki-do (KR)

( * ) Notice: Subject to any disclaimer, the term of this patent is extended or adjusted under 35 U.S.C. 154(b) by 286 days.

(21) Appl. No.: 10/265,155

(22) Filed: Oct. 7, 2002

(65) Prior Publication Data

US 2003/0122968 A1 Jul. 3, 2003

(30) Foreign Application Priority Data

Dec. 29, 2001 (KR) .......................................... 2001-88219

(51) Int. Cl.$^7$ ................................................ H04N 5/21
(52) U.S. Cl. ....................... 348/607; 348/447; 348/448; 348/452; 348/910
(58) Field of Search ................................ 348/447, 448, 348/449, 450, 451, 452, 910, 607, 619, 911, 615, 624, 629, 623, 622; H04N 5/21, 5/213, 7/01

(56) References Cited

U.S. PATENT DOCUMENTS

| | | | | |
|---|---|---|---|---|
| 5,625,421 A | * | 4/1997 | Faroudja et al. ............ | 348/607 |
| 6,154,566 A | * | 11/2000 | Mine et al. .................. | 382/219 |
| 6,421,090 B1 | * | 7/2002 | Jiang et al. .................. | 348/452 |
| 6,577,345 B1 | * | 6/2003 | Lim et al. .................... | 348/452 |
| 6,614,484 B1 | * | 9/2003 | Lim et al. .................... | 348/448 |
| 6,628,341 B1 | * | 9/2003 | Staley et al. ................. | 348/607 |
| 6,731,342 B2 | * | 5/2004 | Shin et al. ................... | 348/452 |

* cited by examiner

*Primary Examiner*—John Miller
*Assistant Examiner*—Trang U. Tran
(74) *Attorney, Agent, or Firm*—Sughrue Mion, PLLC

(57) ABSTRACT

An apparatus and method for processing a video signal, and particularly, an apparatus and method for deleting a sawtooth wave are provided in which a sawtooth wave component is detected and with consideration of direction the sawtooth wave is deleted. The sawtooth wave deleting method includes (a) detecting a sawtooth wave component based on an area dispersion value and motion information in each frame in an input video signal; (b) detecting a direction from the pixels of the detected sawtooth wave component; and (c) deleting the sawtooth wave component by outputting an interpolated pixel in the detected direction. According to the apparatus and method, since interpolation of a sawtooth wave component is performed with consideration of the direction so that the sawtooth wave component is effectively deleted, a much smoother image is provided after deinterlacing.

12 Claims, 5 Drawing Sheets

SAWTOOTH SIGNAL    CORRECTED SAWTOOTH SIGNAL

SAWTOOTH SIGNAL    CORRECTED SAWTOOTH SIGNAL (a) 150°    (b) 135°    (c) 90°

(d) 45°    (e) 30°

APPARATUS AND METHOD FOR DELETING SAWTOOTH WAVE

BACKGROUND OF THE INVENTION

1. Field of the Invention

The present invention relates to an apparatus and method for processing a video signal, and more particularly, to an apparatus and method for deleting a sawtooth wave in which a sawtooth wave component is detected and with consideration of direction the sawtooth wave is deleted. The present application is based on Korean Patent Application No. 2001-88219, filed Dec. 29, 2001, which is incorporated herein by reference.

2. Description of the Related Art

When an interlaced scanning signal is used, flicking and blotting occur and vertical resolution is degraded. In an HDTV system, a progressive scanning method is also employed. In the progressive scanning method, one frame is continuously scanned such that noise on the time axis does not occur and flickering between lines can be considerably reduced unlike the interlaced scanning method. Consequently, an effective deinterlacing method that converts an interlaced scanning signal into a progressive scanning signal is needed. However, if deinterlacing is performed, a sawtooth wave component that looks like a sawtooth between lines is generated in a part where a motion is slow, that is, in an edge part of an object.

FIGS. 1a and 1b are waveform diagrams showing a sawtooth wave pattern and a corrected sawtooth wave pattern in a vertical direction and in a diagonal direction, respectively. If deinterlacing is performed for an interlaced image, a correction signal for deleting a sawtooth wave component is generated by the difference between one line difference and two line difference, and a part to be corrected is made as dotted lines so that the sawtooth wave component is deleted.

FIG. 2 is a block diagram showing the structure of a prior art sawtooth deleting apparatus. A first line delay unit 200 delays an input video signal by one line, and a second line delay unit 201 delays the input video signal by two lines. A sawtooth detection unit 202 receives a one-line difference signal and a two-line difference signal, in which a weighted value of ½ is added to each signal. Absolute value calculating units 202-1 and 202-2 calculate the one-line difference signal and the two-line difference signal as absolute values. Comparators 202-3 and 202-4 compare the absolute values with reference values T1 and T4. If the comparison results indicate that the absolute values are greater than the reference values T1 and T4, H MINs 202-5 and 202-6 generate the sum of differences as a predetermined length. If the outputs of the H MINs 202-5 and 202-6 are greater than another reference values T2 and T5, V MINs 202-7 and 202-8 add pixel values to the outputs of the H MINs 202-5 and 202-6 in a horizontal direction. If the outputs of the V MINs 202-7 and 202-8 are greater than another reference values T3 and T6, the one-line difference becomes a true value and the two-line difference becomes a false value. A logic operation unit 202-9 receives this logic information and other information including film mode information and motion information and outputs a final sawtooth wave detection signal.

The sawtooth wave signal detected in the sawtooth detection unit 202 is input to an H&V extension unit 203 and extended from the pixels of the detected sawtooth wave component by two or three pixels in a width direction and in a length direction. The extended signal is input to a signal conversion unit 204 so that a correction signal is generated. The correction signal is generated by gradual switching between a weighted average value of values that are in the same location as a target pixel in the neighboring lines in a vertical direction, and a value having no change.

Thus, the prior art does not consider the direction when performing correction of a sawtooth wave such that the image obtained after deinterlacing does not look smooth.

SUMMARY OF THE INVENTION

To solve the above problems, it is an objective of the present invention to provide a sawtooth wave deleting apparatus which detects a sawtooth wave component in an input video signal and deletes the sawtooth wave component considering the direction.

To solve the above problems, it is another objective of the present invention to provide a sawtooth wave deleting method by which a sawtooth wave component in an input video signal is detected and the sawtooth wave component is deleted considering the direction.

According to an aspect of the present invention, there is provided a deleting apparatus comprising a detection unit which detects a sawtooth wave component based on a area dispersion value and motion information in each frame in an input video signal; and a deleting unit which deletes the sawtooth wave component based on a direction detected from the pixels of the sawtooth wave component detected by the detection unit.

It is preferable that in the detection unit the region size of the area dispersion is changeable.

It is preferable that the deleting unit detects a direction from the pixels of the sawtooth wave component detected by the detection unit, and obtains an interpolated pixel in the detected direction or performs interpolation for a sawtooth wave component through readjustment.

It is preferable that the deleting unit detects a direction in which a minimum value of sums of differences of pixels in lines adjacent to the pixels of the sawtooth wave component is output.

It is preferable that the deleting unit performs interpolation by obtaining an average value of the pixel values in the detected direction.

It is preferable that the deleting unit performs interpolation by adding a weighted value to the pixel value in the detected direction so that the sum becomes 1.

According to another aspect of the present invention, there is provided a deleting method comprising (a) detecting a sawtooth wave component based on an area dispersion value and motion information in each frame in an input video signal; (b) detecting a direction from the pixels of the detected sawtooth wave component; and (c) deleting the sawtooth wave component by outputting an interpolated pixel in the detected direction.

It is preferable that in (a), the region size of the area dispersion is changeable.

It is preferable that in (b), a direction is detected in which a minimum value of sums of differences of pixels in lines adjacent to the pixels of the sawtooth wave component is output.

It is preferable that (c) comprises (c-1) comparing an interpolated pixel value in the detected direction with the pixel value of the original line; and (c-2) outputting the interpolated pixel in the detected direction according to the result of the comparison.

It is preferable that in (c-2), interpolation is performed by obtaining an average value of the pixel values in the detected direction.

It is preferable that in (c-2), interpolation is performed by adding a weighted value to the pixel value in the detected direction so that the sum becomes 1.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1A:
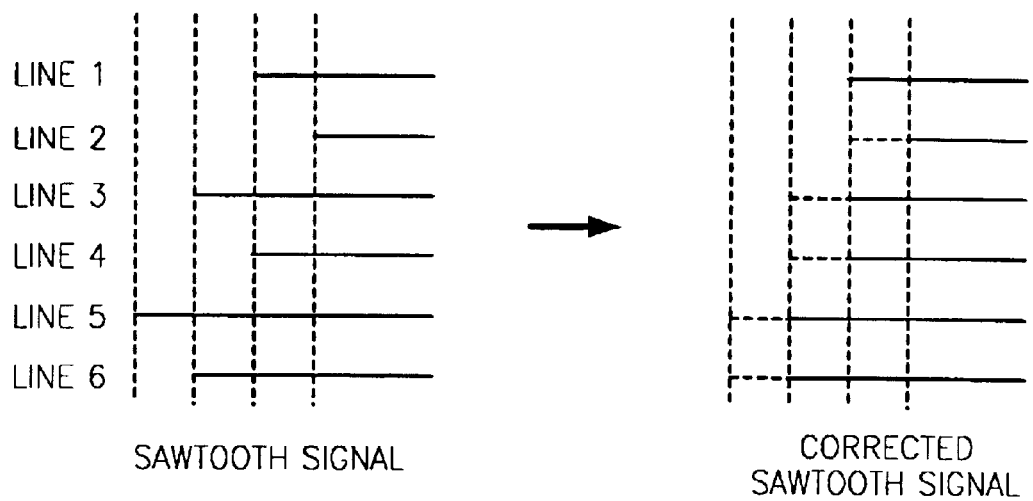
FIGS. 1a and 1b are waveform diagrams showing a sawtooth wave pattern and a corrected sawtooth wave pattern in a vertical direction and in a diagonal direction, respectively.
Figure 1B:
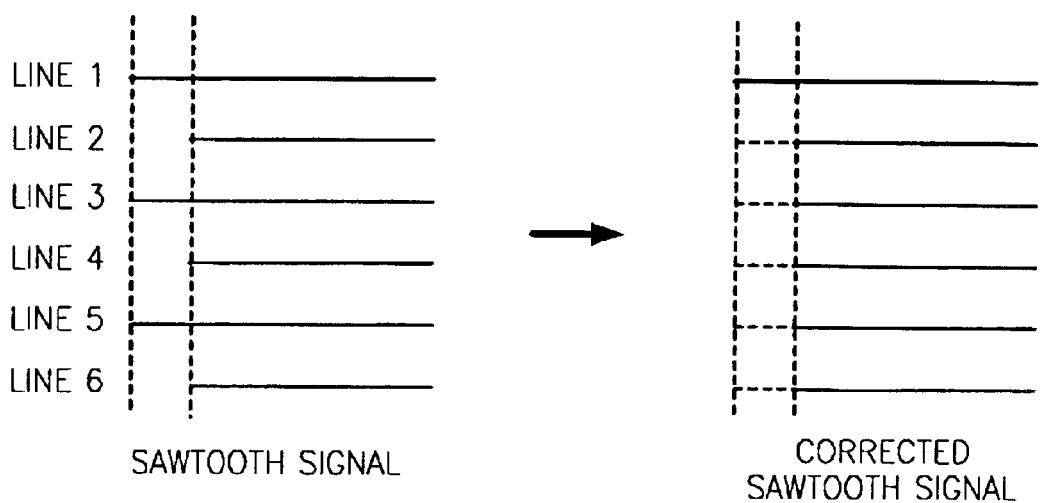
Figure 2:
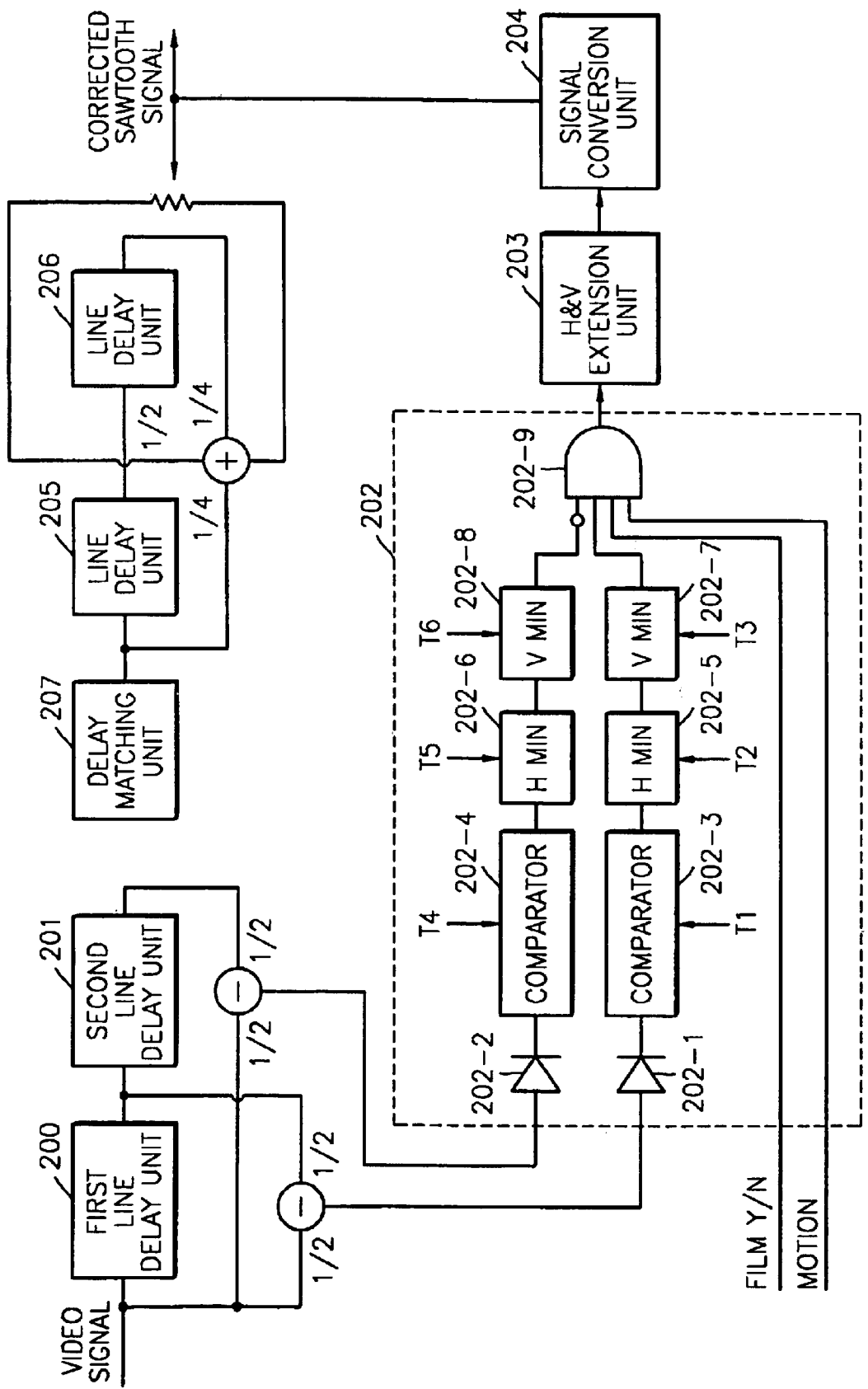
FIG. 2 is a block diagram showing the structure of a prior art sawtooth deleting apparatus.
Figure 3:
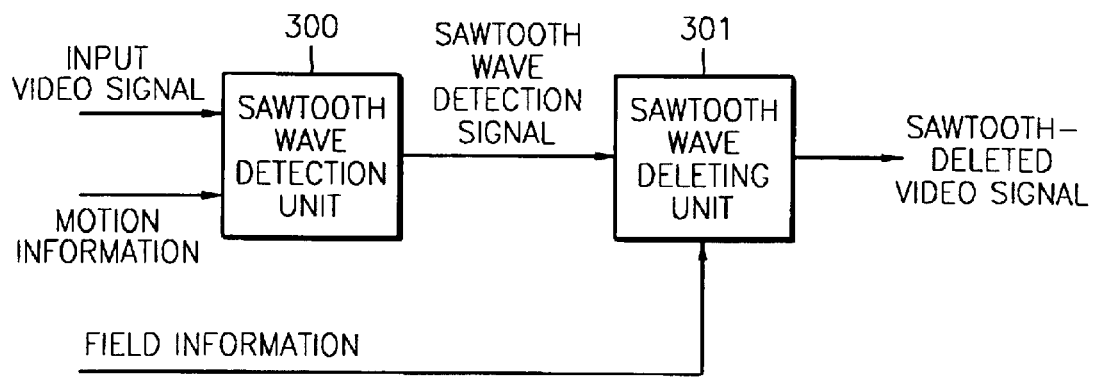
FIG. 3 is a block diagram showing the structure of a sawtooth deleting apparatus according to the present invention.

FIG. 3 is a block diagram showing the structure of a sawtooth deleting apparatus according to the present invention and the apparatus comprises a sawtooth wave detection unit 300 and a sawtooth wave deleting unit 301.

Figure 4:
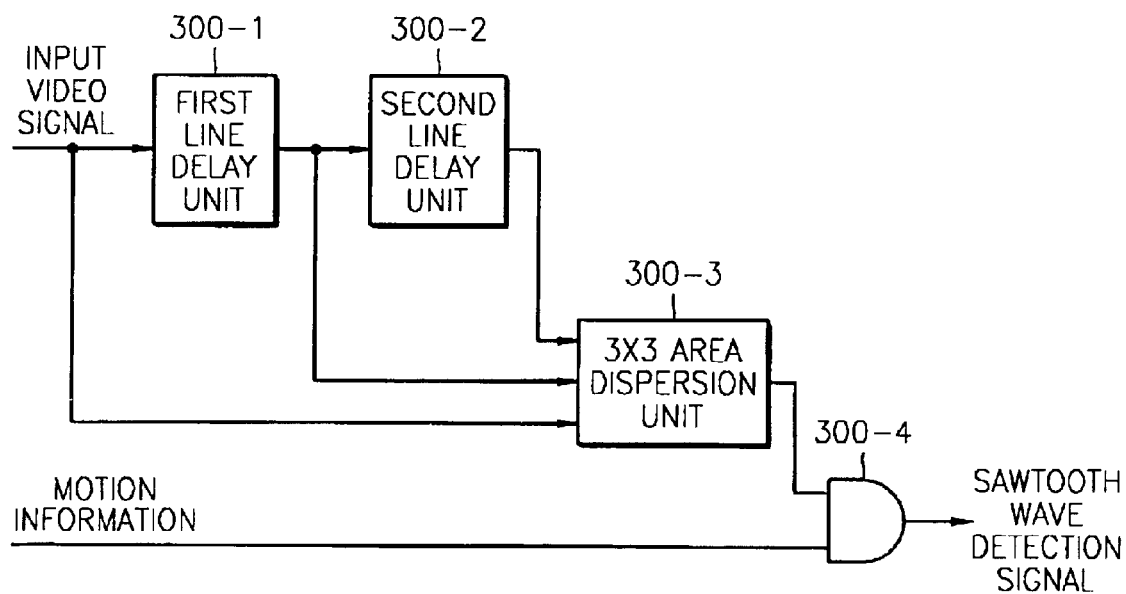
FIG. 4 is a detailed diagram of a sawtooth wave detection unit of the sawtooth deleting apparatus of FIG. 3.

FIG. 4 is a detailed diagram of a sawtooth wave detection unit of the sawtooth deleting apparatus of FIG. 3 and the sawtooth detection unit comprises a first line delay unit 300-1, a second line delay unit 300-2, an area dispersion unit 300-3, and a logic operation unit 300-4.

Figure 5:
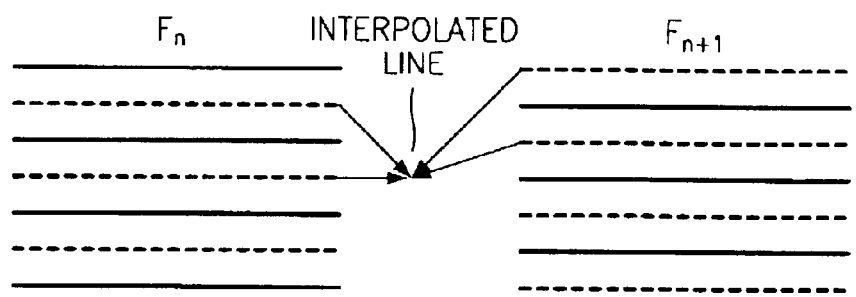
FIG. 5 is a diagram showing the structure of a frame after deinterlacing.
Figure 6:
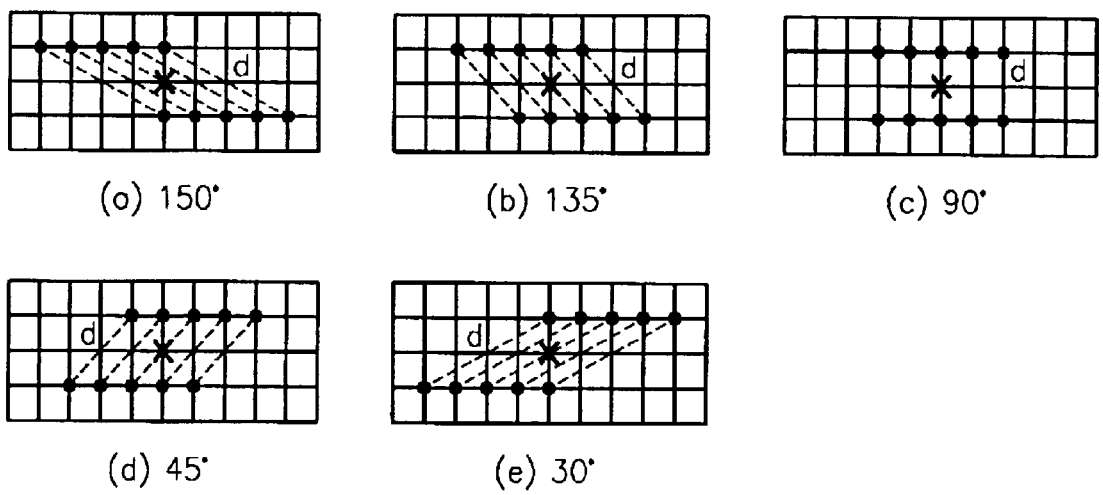
FIG. 6 is a diagram showing a method for determining the direction of pixels.
Figure 7:
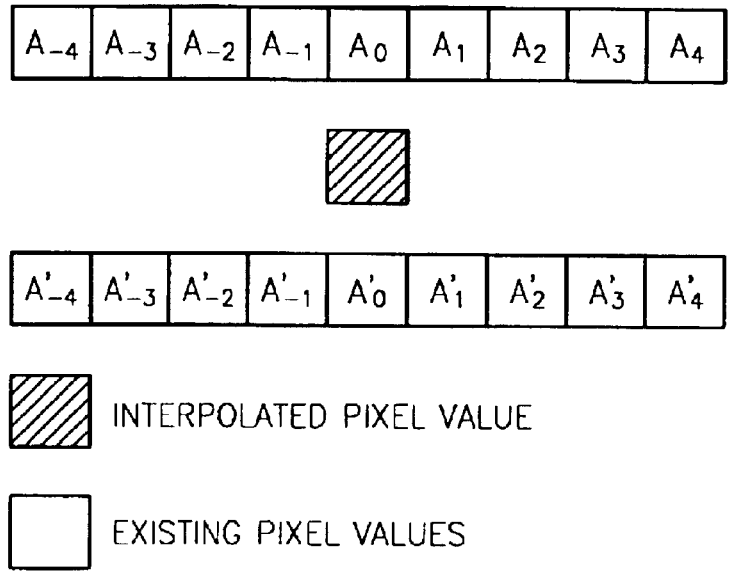
FIG. 7 is a diagram showing the location of a pixel corresponding to the direction shown in FIG. 5.

FIG. 5 is a diagram showing the structure of a frame after deinterlacing, FIG. 6 is a diagram showing a method for determining the direction of pixels, and FIG. 7 is a diagram showing the location of a pixel corresponding to the direction shown in FIG. 5.

Figure 8:
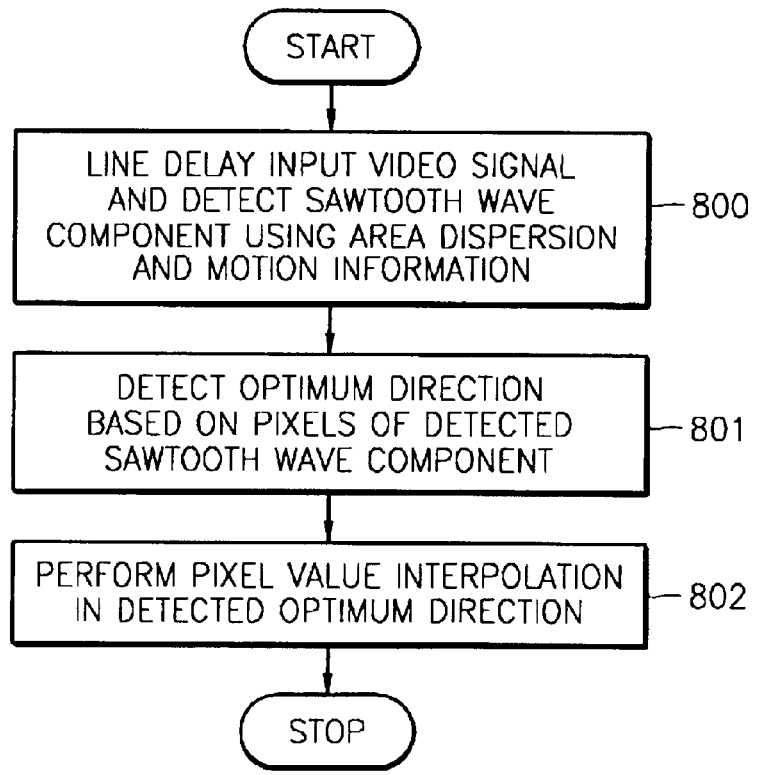
FIG. 8 is a flowchart showing an operation of a method for deleting a sawtooth wave according to the present invention.

FIG. 8 is a flowchart showing an operation of a method for deleting a sawtooth wave according to the present invention and comprises line delaying an input video signal and detecting a sawtooth wave component using area dispersion and motion information in step 800, detecting an optimum direction based on pixels of the detected sawtooth wave component in step 801, and performing pixel value interpolation in the detected optimum direction in step 802.

Referring to FIGS. 3 through 8, the sawtooth wave deleting apparatus and method will now be explained in more details.

A sawtooth wave is generated as a sawtooth shape visible in the boundary part of an object when an interlaced scanning signal is converted into a progressive scanning signal. The characteristics of the sawtooth wave include:

1. When a predetermined area is taken apart and observed, a local variance is large.

2. In the boundary part of an object, appearing patterns vary according to angle.

3. A one line difference is large, while a two line difference is not so large.

4. In a part where motion is slow, the sawtooth wave becomes larger.

In the present invention, the first and fourth characteristics are used among the above characteristics. In a sawtooth wave deleting algorithm according to the present invention, an interlaced scanning video signal is interlace-to-progressive-conversion (IPC) converted and a sawtooth wave component is detected and corrected.

The sawtooth wave detection unit 300 detects a sawtooth wave component from an input video signal and motion information. The input video signal, a video signal which is delayed by one line and output from the first line delay unit 300-1, and a video signal which is delayed by two lines and output from the second line delay unit 300-2 are input to the area dispersion unit 300-3. The area dispersion unit obtains a 3×3 location dispersion for each frame for the input video signals, and detects a sawtooth wave component in a part where the obtained location dispersion value is equal to or greater than a reference value (T). The size of a region of the area dispersion unit 300-3 can be made to vary. An area dispersion value v is obtained by the following equation 1:

$$v(m, n) = \frac{1}{9} \sum_{i=m-1}^{i=m+1} \sum_{j=n-1}^{j=n+1} (x(i, j) - \bar{x}(m, n))^2 \quad (1)$$

where m and n are coordinates, x is a pixel value at the position (m,n), $\bar{x}$ is an average of nine pixel values centering around the position (m,n), and i and j are parameters indicating the position of a pixel surrounding the position (m,n).

An area dispersion value and motion information obtained by the equation 1 are input to the logic operation unit 300-4 and a final sawtooth wave component is detected.

The sawtooth wave deleting unit 301 detects the direction of the detected sawtooth wave signal by using field information and deletes the sawtooth wave signal. The field information that is input to the sawtooth deleting unit 301 is shown in FIG. 5. The field information indicates whether a corresponding frame is generated in a field $F_n$ or a field $F_{n+1}$ after IPC is performed. This field information is used to keep the original value from the field without change and to perform interpolation again in a direction that is found by searching for a direction in an interpolated line.

The sawtooth wave deleting unit 301 searches for the direction of the pixels of the detected sawtooth wave component, sets an optimum direction, and performs interpolation in the set optimum direction for the pixels of the sawtooth wave component. FIG. 6 shows a method for determining the direction of pixels, and a line marked by 'x' indicates a line interpolated through IPC. FIG. 7 shows reference pixel areas corresponding to five directions shown in FIG. 5.

By the method shown in FIG. 6, the sum of differences for 5 pixels in each direction of 150°, 135°, 90°, 45°, and 30° is obtained. The sum of difference in each direction is obtained by the following equation 2:

(a) $\text{Direction}_{150} = |A_{-4} - A_0'| + |A_{-3} - A_1'| + |A_{-2} - A_2'| + |A_{-1} - A_3'| + |A_0 - A_4'|$ (b) $\text{Direction}_{135} = |A_{-3} - A_{-1}'| + |A_{-2} - A_0'| + |A_{-1} - A_1'| + |A_0 - A_0 - A_2'| + |A_1 - A_3'|$ (c) $\text{Direction}_{90} = |A_{-2} - A_{-2}'| + |A_{-1} - A_{-1}'| + |A_0 - A_0'| + |A_1 - A_1'| + |A_2 - A_2'|$ (d) Direction$_{45}$=$|A_{-1}-A_{-3}'|+|A_0-A_{-2}'|+|A_1-A_{-1}'|+|A_2-A_0'|+|A_3-A_1'|$ (e) Direction$_{30}$=$|A_0-A_{-4}'|+|A_1-A_{-3}'|+|A_2-A_{-2}'|+|A_3-A_{-1}'|+|A_4-A_0'|$ (2)

where A and A' are pixel values of dots shown in FIG. 6. That is, A is the pixel value of an upper dot and A' is the pixel value of a lower dot.

By comparing the sums of differences calculated using the equation 2, a direction having a minimum value is obtained. An optimum direction is set as the direction having the minimum value among the calculated values of the equation 2 and is obtained by the following equation 3:

min value=min(Direction$_{150}$,Direction$_{135}$,Direction$_{90}$,Direction$_{45}$, Direction$_{30}$)     (3)

After finding the optimum direction in which the sum of differences is the minimum among the sums of the directions, interpolation is performed by obtaining an average value of pixel values in the direction. When an interpolated value is compared with the pixel value of the original line, if the comparison result is equal to or greater than a reference value, the interpolated value is deemed as a wrongfully interpolated pixel. Then, shifting from the adjacent lines to the next adjacent lines, that is, to the lines two lines upper or lower (n−2 line and n+2 line), a direction is searched for in those lines by the method as shown in FIG. 6, and an average value is obtained and an interpolated line is formed. When an interpolated value is compared with the pixel value of the original line, if the comparison result is less than the reference value, the interpolated value is deemed as an accurately interpolated pixel. Also, after finding an optimum direction in which the sum of differences is the minimum among the sums of the respective directions, interpolation may be performed by adding a weighted value to the pixel value of the obtained direction so that the sum becomes 1.

FIG. 8 is a flowchart showing an operation of a method for deleting a sawtooth wave according to the present invention. First, with inputs of the video signal, the one line delayed video signal, and the two line delayed video, a sawtooth wave component is detected from 3×3 area dispersion and motion information in step 800. In the present invention, the size of an area dispersion region can be made to vary.

An optimum direction is searched for based on the pixels of the detected sawtooth wave component in step 801. As a preferred embodiment of the present invention, by finding a direction among directions of 150°, 135°, 90°, 45°, and 30°, an optimum direction is found.

Interpolation of pixel values are performed in the optimum direction in step 802.

In each direction, the sum of differences between pixels in adjacent lines is calculated and the sizes are compared with each other. A direction having a minimum sum of differences between pixels in adjacent lines is determined as the optimum direction, and interpolation is performed by obtaining an average value of the pixel values in the direction. Also, interpolation may be performed by adding a weighted value to the pixel values in the direction so that the sum becomes 1. The interpolated pixel value is compared with the pixel value of the original line and it is determined whether or not the comparison result is less than a reference value. If the comparison result is equal to or greater than the reference value, the interpolated value is deemed as a wrongfully interpolated pixel. Then, shifting from the adjacent lines to the next adjacent lines, that is, to the lines which are two lines above or below (n−2 line and n+2 line), a direction is searched for in those lines and an average value is obtained and an interpolated line is formed. When an interpolated value is compared with the pixel value of the original line, if the comparison result is less than the reference value, the interpolated value is deemed as an accurately interpolated pixel and interpolation is finished.

The present invention is not restricted to the above-described embodiments and many variations are possible within the spirit and scope of the present invention. The scope of the present invention is not determined by the above description but by the accompanying claims.

According to the apparatus and method according to the present invention as described above, since interpolation of a sawtooth wave component is performed with consideration of the direction so that the sawtooth wave component is effectively deleted, a much smoother image is provided after deinterlacing.

What is claimed is:

1. A deleting apparatus comprising:
    a detection unit for detecting a sawtooth wave component based on an area dispersion value and motion information in each frame in an input video signal; and
    a deleting unit for deleting the sawtooth wave component based on a direction detected from pixels of the sawtooth wave component detected by the detection unit,
    wherein the area dispersion value is obtained by the following equation:

$$v(m, n) = \frac{1}{9} \sum_{i=m-1}^{i=m+1} \sum_{j=n-1}^{j=n+1} (x(i, j) - y(m, n))^2$$

where m and n are coordinates, x is a pixel value at the position (m,n), y is an average of nine pixel values centering around the position (m,n) and i and j are parameters indicating the position of a pixel surrounding the position (m,n).

2. The deleting apparatus of claim 1, wherein in the detection unit, a region size of an area dispersion is changeable.

3. The deleting apparatus of claim 1, wherein the deleting unit detects a direction from the pixels of the sawtooth wave component detected by the detection unit, and obtains an interpolated pixel in the detected direction or performing interpolation for the sawtooth wave component through readjustment.

4. The deleting apparatus of claim 3, wherein the deleting unit detects the direction by detecting a direction in which a minimum value of sums of differences of pixels in lines adjacent to the pixels of the sawtooth wave component is output.

5. The deleting apparatus of claim 3, wherein the deleting unit performs interpolation by obtaining an average value of the pixel values in the detected direction.

6. The deleting apparatus of claim 3, wherein the deleting unit performs interpolation by adding a weighted value to the pixel value in the detected direction so that the sum becomes 1.

7. A deleting method comprising:
    (a) detecting a sawtooth wave component based on an area dispersion value and motion information in each frame in an input video signal;
    (b) detecting a direction from pixels of the detected sawtooth wave component; and
    (c) deleting the sawtooth wave component by outputting an interpolated pixel in the detected direction,
    wherein the area dispersion value is obtained by the following equation:

$$v(m,n) = \frac{1}{9} \sum_{i=m-1}^{i=m+1} \sum_{j=n-1}^{j=n+1} (x(i,j) - y(m,n))^2$$

where m and n are coordinates, x is a pixel value at the position (m,n), y is an average of nine pixel values centering around the position (m,n) and i and j are parameters indicating the position of a pixel surrounding the position (m,n).

8. The deleting method of claim 7, wherein in (a), a region size of an area dispersion is changeable.

9. The deleting method of claim 7, wherein in (b), the direction is detected in which a minimum value of sums of differences of pixels in lines adjacent to the pixels of the sawtooth wave component is output.

10. The deleting method of claim 7, wherein (c) comprises:

(c-1) comparing an interpolated pixel value in the detected direction with a pixel value of the original line; and (c-2) outputting the interpolated pixel in the detected direction according to a result of the comparison.

11. The deleting method of claim 10, wherein in (c-2), interpolation is performed by obtaining an average value of pixel values in the detected direction.

12. The deleting method of claim 10, wherein in (c-2), interpolation is performed by adding a weighted value to the pixel value in the detected direction so that the sum becomes 1.

* * * * *